(12) United States Patent
Nöbauer et al.

(10) Patent No.: US 9,533,635 B2
(45) Date of Patent: Jan. 3, 2017

(54) NETWORK COMPONENT FOR A VEHICLE NETWORK AND CORRESPONDING VEHICLE NETWORK

(71) Applicant: CONTINENTAL AUTOMOTIVE GMBH, Hannover (DE)

(72) Inventors: Josef Nöbauer, Neukirchen-Balbini (DE); Andreas Rath, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 329 days.

(21) Appl. No.: 14/363,191

(22) PCT Filed: Dec. 5, 2012

(86) PCT No.: PCT/EP2012/074532
§ 371 (c)(1),
(2) Date: Jun. 5, 2014

(87) PCT Pub. No.: WO2013/083644
PCT Pub. Date: Jun. 13, 2013

(65) Prior Publication Data
US 2015/0321627 A1    Nov. 12, 2015

(30) Foreign Application Priority Data
Dec. 6, 2011   (DE) .......................... 10 2011 087 828

(51) Int. Cl.
*B60R 16/023*  (2006.01)
*H04L 12/40*   (2006.01)
*H04B 3/54*    (2006.01)

(52) U.S. Cl.
CPC ........... *B60R 16/0231* (2013.01); *H04B 3/548* (2013.01); *H04L 12/40045* (2013.01); *H04B 2203/547* (2013.01); *H04L 2012/40273* (2013.01)

(58) Field of Classification Search
CPC ................................................. B60R 16/0231
(Continued)

(56) References Cited

U.S. PATENT DOCUMENTS 6,566,765 B1 *  5/2003  Nitschke ................. B60R 21/01
                                                    180/268
7,072,407 B2 *  7/2006  Schurig .................. H04B 3/542
                                                    375/257
(Continued)

FOREIGN PATENT DOCUMENTS

CN     201243281    5/2009
CN     101512920    8/2009
(Continued)

*Primary Examiner* — Rexford Barnie
*Assistant Examiner* — Daniel Kessie
(74) *Attorney, Agent, or Firm* — Cozen O'Connor

(57) ABSTRACT

A network component has a signal processing device having a processor, at least one voltage source that can be connected to a supply network of the vehicle, and at least one coupling device connected to the signal processing device and the voltage source. Lines of at least one network segment of the vehicle network can be connected to the coupling device for the simultaneous signal connection of the network segment to the signal processing device and for the voltage supply of the network segment by the voltage source. The voltage source is configured such that a voltage ratio between at least one supply voltage provided by the voltage source and the voltage provided by the supply network can be selected from a selection of several predetermined voltage ratios.

10 Claims, 4 Drawing Sheets

(58) Field of Classification Search
USPC .................................................. 307/10.1, 9.1
See application file for complete search history.

(56) References Cited

U.S. PATENT DOCUMENTS

| | | | |
|---|---|---|---|
| 7,417,443 B2 * | 8/2008 | Admon | H04L 12/10 324/522 |
| 8,605,740 B2 | 12/2013 | Chochois Kartmann et al. | |
| 2004/0160312 A1 | 8/2004 | Fisher et al. | |
| 2005/0281326 A1 * | 12/2005 | Yu | H04B 3/44 375/222 |
| 2008/0290729 A1 | 11/2008 | Schoenberg et al. | |
| 2009/0079558 A1 | 3/2009 | Diab | |
| 2011/0134976 A1 | 6/2011 | Fossion et al. | |

FOREIGN PATENT DOCUMENTS

| | | |
|---|---|---|
| DE | 10 2007 056 234 | 7/2008 |
| DE | 10 2010 008 818 | 8/2011 |
| DE | 10 2010 049 835 | 5/2012 |
| EP | 2 073 435 A1 | 6/2009 |
| EP | 2 326 026 A1 | 5/2011 |
| WO | WO 2008/015316 A1 | 2/2008 |

* cited by examiner

NETWORK COMPONENT FOR A VEHICLE NETWORK AND CORRESPONDING VEHICLE NETWORK

CROSS-REFERENCE TO RELATED APPLICATIONS

This is a U.S. national stage of application No. PCT/EP2012/074532, filed on 5 Dec. 2012, which claims priority to the German Application No. 10 2011 087 828.9, filed 6 Dec. 2011, the content of both incorporated herein by reference.

BACKGROUND OF THE INVENTION

1. Field of the Invention

The invention relates to a network component, in particular a network-capable vehicle component, of a vehicle network. The invention also relates to a corresponding vehicle network having the one network component and at least one further network component.

2. Related Art

Such a network component of a vehicle network is, for example, a network-capable vehicle component. The corresponding vehicle network is a network for transmitting digital signals between network components, at least one component of which is in the form of a network-capable vehicle component. Vehicle networks are currently usually based on serial bus systems. In addition to the corresponding bus topology, other network topologies are also already envisaged for use in vehicles. One example of a bus system for networking the various network-capable vehicle components in order to achieve cross-system functions of a vehicle is an asynchronous, serial bus system based on the CAN (Controller Area Network) bus. Another example is an LIN: Local Interconnect Network bus system. Such a vehicle network is used, for example, to connect components of a driver assistance system for signaling purposes. Corresponding network-capable vehicle components are, for example, control devices for the engine, transmission, etc., operating and display units typical of a vehicle and monitoring units of vehicle sensors.

The network-capable vehicle components of the vehicle network are vehicle components which, in different embodiments, are directly operated from a supply network (vehicle electrical system) of the vehicle which is independent of the respective vehicle network.

In the case of direct energy supply from the vehicle electrical system, a complicated power supply unit with filter and protective components is needed in each of the vehicle components in order to withstand voltage pulses occurring in the vehicle.

Networks in which individual network components are supplied with energy via the signal lines of the network or the signal lines of individual network segments of the network are also known. One example of such a network is a Power Over Ethernet (PoE) network. In this case, Power Over Ethernet (PoE) denotes a method which can be used to supply network-capable devices in the Ethernet network with power via the 8-core Ethernet cable.

EP 2 073 435 A1 describes the use of Power Over Ethernet for a video and audio system installed in a vehicle. The network components of the network shown are only the loudspeakers, displays, etc., which are conventional for such systems.

SUMMARY OF THE INVENTION

An object of the invention is to provide a network component that can be universally used for a multiplicity of different vehicle networks and to provide a corresponding vehicle network in which the further network components can be simplified.

The network component according to an aspect of the invention has a signal processing device which has a processor, at least one voltage source which can be connected to a supply network of the vehicle, and at least one coupling device simultaneously connected to the signal processing device and to the voltage source. The lines of at least one network segment of the vehicle network can be connected to the coupling device for the purpose of simultaneously connecting this network segment, for signaling purposes, to the signal processing device and for the purpose of supplying voltage to this network segment of the voltage source. In this case, the voltage source is set up such that a voltage ratio between at least one supply voltage Vout, V1out, V2out provided by the voltage source and the voltage Vin provided by the supply network can be selected from a selection of a plurality of predetermined voltage ratios. This ratio is, for example, a ratio of 5 volts to 12 volts (5 V/12 V) or 3.3 volts to 12 volts (3.3 V/12 V). In this case, the voltage values of 5 V and 3.3 V are typical voltage values of logic modules (TTL logic, etc.). In contrast, the supply network (vehicle electrical system) of an automobile typically provides a supply voltage of 12 volts. The voltage source is, in particular, a multi-voltage power supply unit.

At least one further network component is connected in the at least one network segment. This network component or at least one of these network components can be supplied with at least one supply voltage selectable from a selection of a plurality of predetermined voltage levels U1, U2, ... using the voltage source or is supplied with this supply voltage using the voltage source. This at least one further network component is preferably also a network-capable vehicle component. Examples of such network-capable vehicle components are control devices for the engine, transmission, etc., vehicle-specific operating and display units and monitoring units of vehicle sensors. The vehicle network is therefore a data network of a vehicle which has been extended with an energy supply component. The vehicle network is advantageously a Power Over Ethernet (PoE) network. However, a PoE network which does not correspond to the IEEE standard 802.3af or 802.3at (PoE+) and has at least one supply voltage adapted to the needs of the network-capable vehicle components is particularly preferred.

Conventional vehicle components which previously had to be supplied using the parallel supply network (vehicle electrical system) of the vehicle can now be supplied with electrical energy via the vehicle network providing the supply voltage without a relatively large amount of effort. In this case, the complicated filter and protective components which are conventional during supply via the vehicle electrical system can be dispensed with in each of the further vehicle components. These filter and protective components are only required in the at least one vehicle component providing the supply voltage.

Another advantage emerges in vehicle networks in which the further network components of at least one (first) network segment are intended to be temporarily switched to the inactive state and are intended to be "woken up" again in order to save energy or for other reasons. This can be effected, on a network segment basis, by disconnecting and connecting the voltage supply by the one network component.

The vehicle network is, in particular, a vehicle network of a motor vehicle. Motor vehicles are, inter alfa, motorcycles, automobiles, trucks, buses and corresponding special-purpose motor vehicles (diggers, etc.).

In particular, provision is made for at least one of the voltage levels to be lower than 12 volts, in particular in the range of 0 volts≤x≤10 volts. Such low voltages are required by some vehicle components as standard. These are, for example, sensors that must manage without additional wiring in order to obtain the operating voltages required for their electronic components and are nevertheless subject to restrictions in terms of size with respect to the available installation space.

One preferred embodiment of the invention provides for the voltage source to be intended for a voltage level of the voltage provided by the supply network which is a voltage level typical of a vehicle. Voltage levels typical of a vehicle for motor vehicles are, for example, voltages typical of the vehicle electrical system such as 12 volts for automobiles, 24 volts for trucks/buses, 48 volts for electric and hybrid motor vehicles and 600 V for pure electric vehicles. In particular, all voltage levels U1, U2, . . . are voltage levels typical of a vehicle.

A network component that provides a supply voltage having voltage levels typical of a vehicle has the advantage that conventional vehicle components, which previously had to be supplied using the parallel vehicle electrical system of the vehicle, can now be supplied with electrical energy via the vehicle network with particularly little need for change.

Provision is advantageously made for the voltage source to have a filter and/or protective circuit for eliminating interference voltage components coming from the supply network. The further network components supplied by the network component do not require any separate filter and/or protective circuits or require only simpler filter and/or protective circuits or can accordingly have a simpler configuration.

Another preferred embodiment of the invention provides for the network component to be set up to supply at least two network segments or at least two groups of network segments with supply voltages of different voltage levels.

Another preferred embodiment of the invention provides for the network component to have an input device for manually selecting the at least one voltage level and/or a signaling connection between the processor of the signal processing device and the voltage source for the control thereof by the processor. The processor for its part can in turn be controlled using the vehicle network, with the result that the voltage level can also be selected via the network. That is to say the voltage or energy can be set in a variable manner depending on communication on the vehicle network.

In particular, the selection of the at least one voltage level or the voltage ratio is a manual selection. For this purpose, the network component has the input apparatus for manual selection. Alternatively or additionally, the selection is made by control using the processor of the signal processing device. For this purpose, the processor of the signal processing device is connected to the at least one voltage source via the control line.

If a plurality of line pairs are used for each network segment, a plurality of different supply voltages can also be provided for each network segment using the different line pairs.

Provision is advantageously made for either one line pair or two line pairs to be able to be connected to the coupling device for each network segment.

Another advantageous refinement of the network component according to an aspect of the invention provides for the signal processing device to comprise a network switch for switchably connecting the at least one network segment to at least one second network segment of the vehicle network for signaling purposes, the lines of this second network segment being able to be connected to the signal processing device.

The vehicle network according to the invention has at least one above-mentioned network component, at least one network segment and at least one further network component in the at least one network segment, in which case the further network component can be or is supplied with supply voltage by the one network component.

One advantageous refinement of the vehicle network according to an aspect of the invention provides for the further network component or at least one of the further network components to be a network-capable vehicle component.

Finally, provision is advantageously made for the vehicle network to have a branched topology, in particular a star topology, a tree topology and/or a meshed topology.

The vehicle network is preferably a Power over Ethernet (PoE) network, but a PoE network which does not correspond to the IEEE standard 802.3af or 802.3at (PoE+) and has parameters adapted to the needs of the network-capable vehicle components, in particular a supply voltage adapted to the at least one required voltage of this/these network-capable vehicle component(s), is particularly preferred.

BRIEF DESCRIPTION OF THE DRAWINGS

The invention is explained in more detail below using preferred exemplary embodiments with reference to the attached drawings, in which.

DETAILED DESCRIPTION OF THE PRESENTLY PREFERRED EMBODIMENTS

Figure 1:
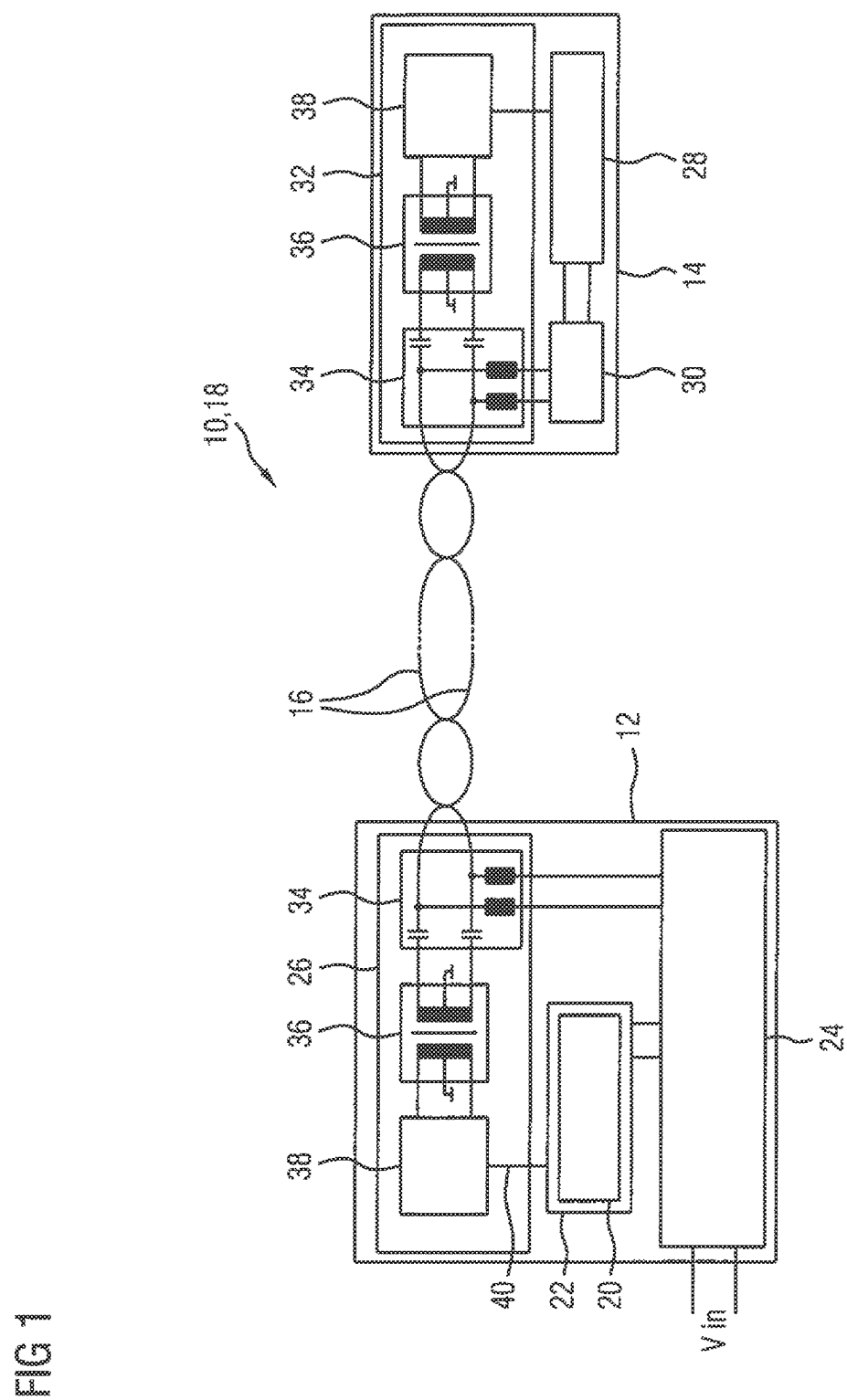
FIG. 1 shows a circuit diagram of a simple vehicle network according to a first advantageous refinement of the invention.

FIG. 1 shows a vehicle network 10 having a particularly simple construction. This vehicle network 10 has a network component 12 and a further network component 14 which are connected by lines 16 in a network segment 18. In the simple vehicle network 10 in FIG. 1, this network segment 18 is already the entire network 10. The one network component 12 is a network component 12 for supplying the further network component 14 with voltage or for supplying the further network component 14 with electrical energy via the lines 16 of the network segment 18.

The one network component 12 has a signal processing device 22 comprising a processor 20, a voltage source 24 and a coupling device 26, which is connected to the signal processing device 22 and to the voltage source 24. The signal processing device 22 of the one network component 12 in FIG. 1 is a signal processing device for the network component itself.

As will subsequently be discernible in the exemplary embodiments in FIGS. 2 and 3, the signal processing device 22 may also be a signal processing device having a function for the entire network 10 (switch function). The coupling device 26 is set up in such a manner that the lines 16 of the network segment 18 can be connected to the coupling device 26 for the purpose of simultaneously connecting this network segment 18 to the signal processing device 22 for signaling purposes and for the purpose of supplying voltage to this network segment 18 by the voltage source 24. In this case, exactly two lines 16 are provided for the vehicle network 10 or network segment 18.

The further network component 14 likewise has a signal processing device 28 which is in the form of a processor 20, a voltage supply unit 30 for the signal processing device 28 and a coupling device 32 which is connected to the signal processing device 28 and to its voltage supply unit 30. The voltage supply unit is in the form of a linear regulator or has a linear regulator. The coupling device 32 of the further network component 14 substantially corresponds, in terms of function and structure, to the coupling device 26 of the one network component 12.

The exemplary embodiment in FIG. 1 therefore shows a 1:1 relationship between the one network component 12, acting as a supply unit, and the further network component 14, acting as a device for the vehicle (unbranched network topology).

The coupling devices 26, 32 each have a coupling network 34. The coupling network 34 has a current path with a branch for each associated line 16, a capacitive component being arranged in one branch and an inductive component being arranged in the other branch. The connection for signaling purposes is effected via the first branch and the voltage is supplied via the second branch. A transformer 36 and a physical interface (PHY) 38 are connected downstream of the first branches. The physical interface is connected, for signaling purposes, to the processor 20 of the respective signal processing device 22, 28.

The voltage source 24 has a voltage input Vin for connection to the supply network (vehicle electrical system) of the corresponding vehicle. In order to decouple the voltage of the voltage source from voltage spikes, etc., in the vehicle electrical system, the voltage source 24 has filters and/or a protective circuit on the side of the vehicle electrical system.

The supply voltage Vout, V1out, V2out provided by the voltage source 24 for the network segment(s) 18 can be selected from a selection of a plurality of predetermined voltage levels. The at least one voltage level is selected, for example, manually using an input device or using a signaling connection (a control line) 40 between the processor 20 of the signal processing device 22 and the voltage source 24 for the control thereof by the processor 20. Since the processor 20 can be controlled via the vehicle network 10, the selection can therefore also be made via the network 10.

Figure 2:
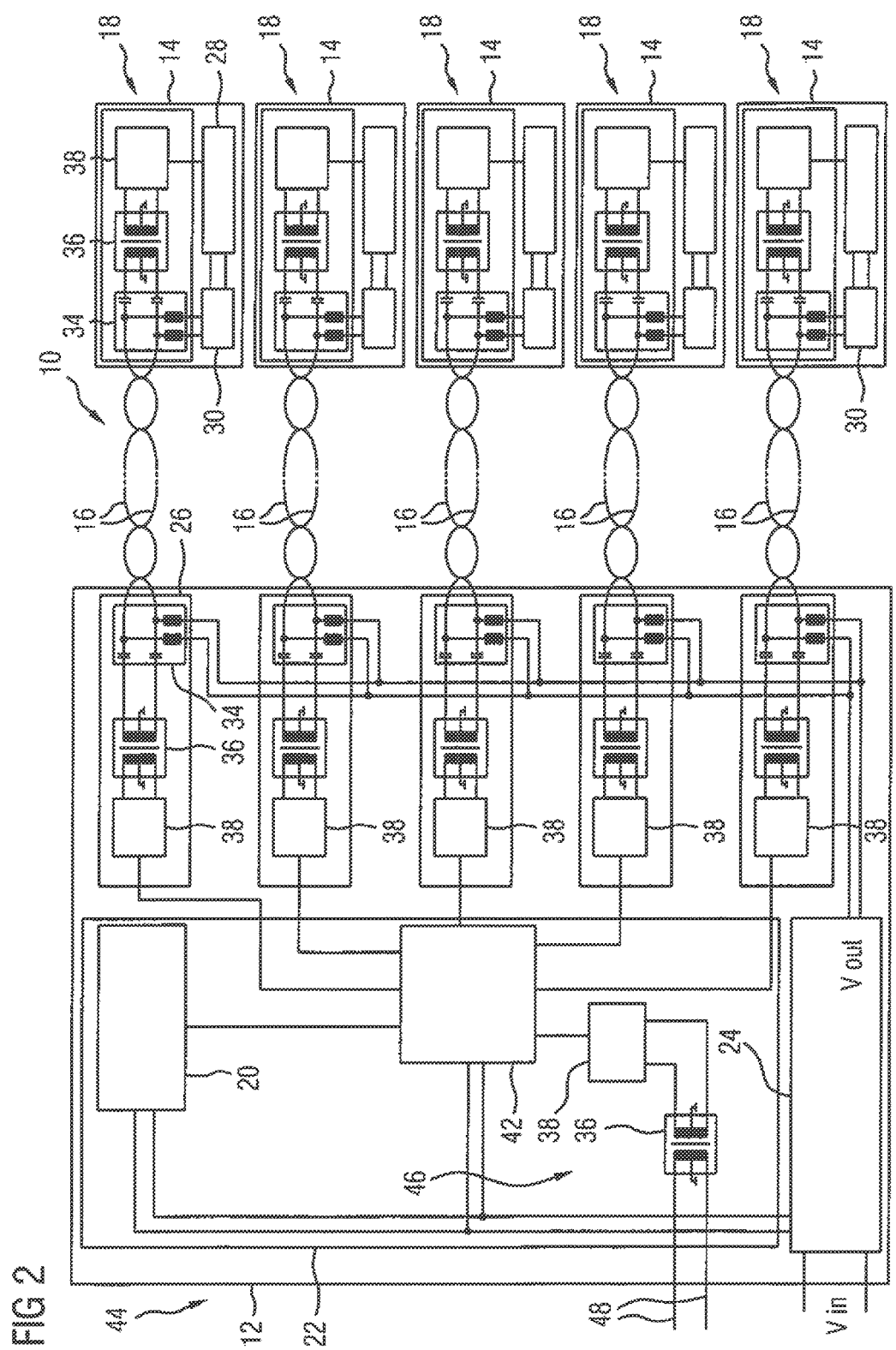
FIG. 2 shows a circuit diagram of a vehicle network according to a second advantageous refinement of the invention.
Figure 3:
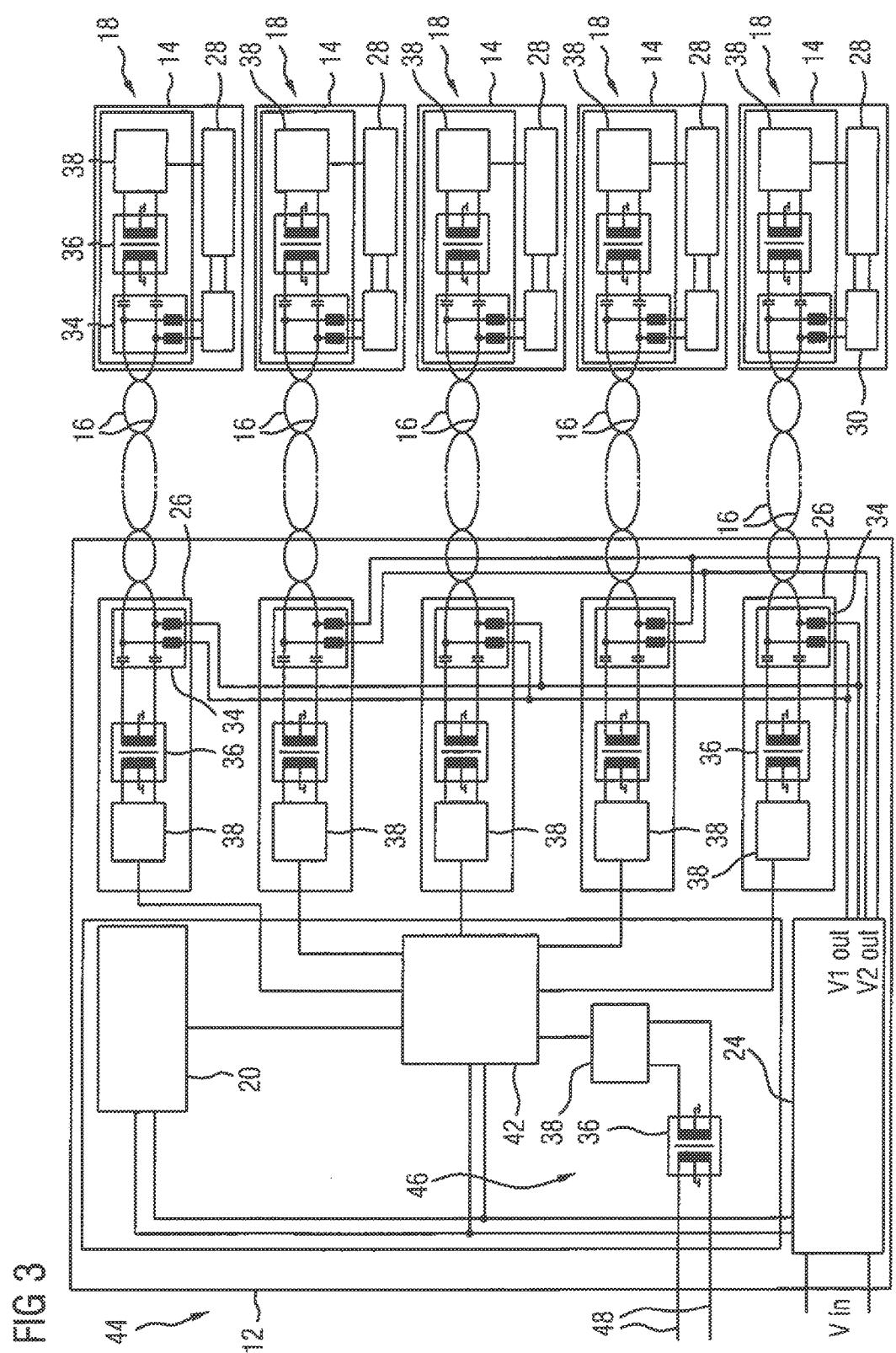
FIG. 3 shows a circuit diagram of a vehicle network according to a third advantageous refinement of the invention.

The vehicle networks 10 shown in FIGS. 2 and 3 each show a branched network topology. The vehicle networks 10 shown may be, for example, subnetworks of a larger vehicle network having a tree topology.

The exemplary embodiments in FIGS. 2 and 3 correspond, in some aspects, to the exemplary embodiment in FIG. 1, with the result that only the differences shall be discussed here. The vehicle networks 10 shown in FIGS. 2 and 3 have a 5:1 relationship between the one network component 12 acting as a supply unit and the further network components 14 acting as devices for the vehicle (branched network topology).

The one network component 12 is a switch device, the signal processing device 22 of which has a network switch 42 for switchably connecting the at least one network segment 18 to at least one second network segment 44 of the vehicle network 10 for signaling purposes. In the signal processing device 22 of these exemplary embodiments, the processor 20 is additionally used as a switch manager of the network switch 42. This is connected to the plurality of (here five) first network segments 18 via the plurality of (here five) coupling devices 26 and is connected to the lines 48 of the second network segment 42 via a series circuit 46 comprising a transformer and a physical interface (PHY). If the switch device is arranged at the head end (at the root) of a vehicle network 10 having a tree topology, the switch device is connected to a network manager (not shown) in the second network segment 42.

The voltage source 24 of the one network component 12 shown in FIG. 3 has two different voltage outputs V1out, V2out. The latter are connected to different groups of network segments 18 (group 1: first, third and fifth network segments; group 2: second and fourth network segments). The different voltage outputs can provide different supply voltages.

Figure 4:
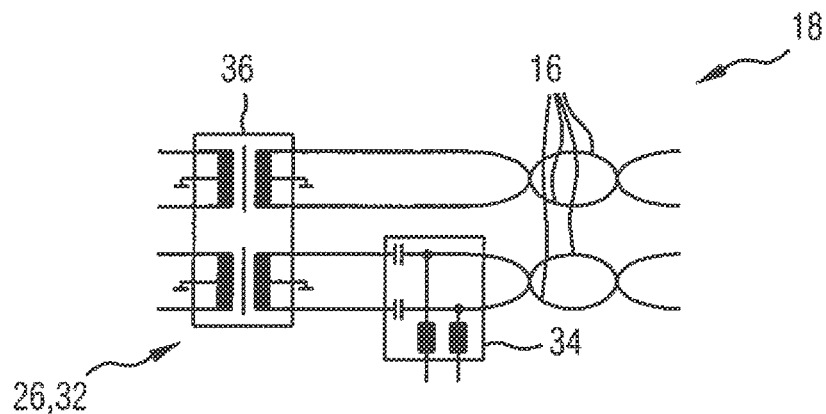
FIG. 4 shows a circuit diagram of a coupling device for a network component according to a first advantageous refinement of a network component.
Figure 5:
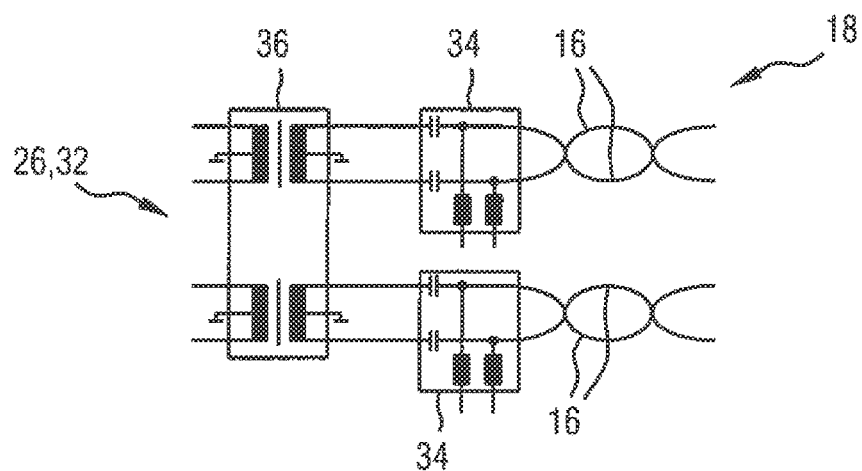
FIG. 5 shows a circuit diagram of a coupling device for a network component according to a second advantageous refinement of the network component.

FIGS. 4 and 5 show an exemplary embodiment of the coupling network 34 in an Ethernet network having 100BaseTx as the physical layer. Two line pairs are provided in the corresponding network segment 18. In the embodiment in FIG. 4, the coupling device 32 has a coupling network 34 for one of these line pairs, whereas the other of the line pairs is directly connected to the physical interface 38 via a transformer. In the embodiment in FIG. 5, the coupling device 32 has a coupling network 34 for both line pairs.

Figure 6:
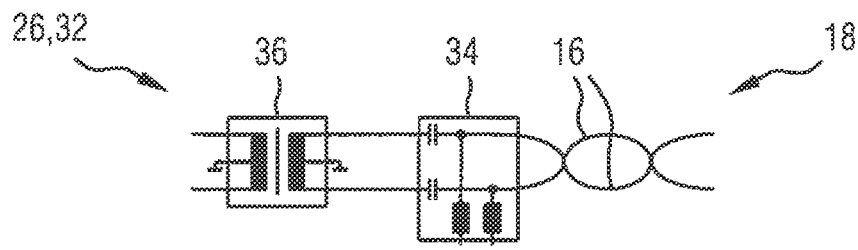
FIG. 6 shows a circuit diagram of a coupling device for a network component according to a third advantageous refinement of the network component.

FIG. 6 shows an exemplary embodiment of the coupling network 34 in an Ethernet network having BroadR-Reach™ as the physical layer. The coupling device 32 corresponds to the coupling devices described in FIGS. 1 to 3.

The general concept of the vehicle network 10 and of the supplying network component 12 is power supply for and communication with further network components (devices) 14 using the same physical medium which, in this case, is specifically Ethernet, as defined in the IEEE 802.3 standards. Special electrical physical layers, such as the BroadR-Reach™ technology from Broadcom, can also be used in this case. In contrast to normal PoE or PoE+, a supply voltage independent of the actual battery voltage is specifically transmitted, with the result that the field of application in motor vehicles (automobiles) is possible, in particular. In this case, it is possible to use the vehicle electrical system voltage or a vehicle electrical system voltage from which interference pulses have been removed (for example 12 V/48 V or even higher voltages, for example 600 V, in electric vehicles). Furthermore, it is also possible to use a voltage of less than 12 V, with the result that the electronic components can be directly supplied without further regulation stages. Voltages such as 5 V or 3.3 V or 1.2 V are typically used in this case. Depending on the cable used, it is also possible to take into account a corresponding voltage drop on the cable and in the coupling device in this case. The level of the voltage is generally not restricted to the values stipulated in the PoE standardization.

In this case, a supplying network component (supply unit) 12 feeds energy into the (Ethernet) lines 16 via a coupling network. Only one unit, the so-called supply unit, is directly connected to the supply network (vehicle electrical system of the vehicle). The supply unit comprises a power supply unit containing filter and protective components and, depending on the use and connected devices, provides an output voltage which corresponds to that of the main supply network or else may also differ therefrom (for example a 48 V main supply and a 12 V output voltage from the supply unit or a 12 V main supply and a 6 V output voltage from the supply unit). This voltage is fed into the connected Ethernet line(s) using a coupling network. It is possible to generate special voltage values in the supply unit, which are typically otherwise not transmitted via lines in a vehicle (for example 7 V).

One of the further network components 14 taps off power from the (Ethernet) lines via its coupling network 34. The other further network components 14 likewise comprise a coupling network 34 in order to separate the transmitted voltage from the Ethernet signals. After separation, different mechanisms can be used to generate the voltages required in the component 14. One example of this is a linear regulator for obtaining a fixed voltage of 5 V or 3.3 V.

The following advantages emerge:
1. Advantages in the laying of the lines (cabling, in particular in the cable harness) of the vehicle. The multiplexing of the signal and supply lines results in a cost advantage since the cabling complexity is reduced, that is to say the supply lines, which are normally present, can be dispensed with.
2. Advantages in the further network components (devices) 14 installed in the vehicle. Considerable savings result in comparison with the direct connection of all further network components 14 to the vehicle electrical system since overvoltage protection, filters and a switched-mode power supply are required only in the at least one network component 12. The possibility of using linear regulators in the further network components (devices) 14 to be supplied results in fewer problems with respect to electromagnetic compatibility (EMC) since it is possible to dispense with switched-mode power supplies. Furthermore, the further network components 14 to be supplied can be implemented in a more space-saving manner on account of the components which are dispensed with. This also makes it possible to directly supply electronic components (5 V or 3.3 V etc.).

Advantages in comparison with the standardized Power over Ethernet (PoE). In comparison with the standardized PoE, this approach is suitable for a supply voltage of 12 V (+/−x V) and can therefore be used in vehicles without changing the general supply strategy (that is to say changing to a 48 V vehicle electrical system). Considerable savings likewise result in comparison with remote feeding via PoE since the control components required under PoE and the DC/DC converter are dispensed with in the modules to be supplied. At the same time, the use of linear regulators reduces the electromagnetic radiation in comparison with the DC/DC converters required under PoE.

Furthermore, the transmitted supply voltage can be adapted to the further network components 14 and the efficiency can therefore be optimized. Therefore, in comparison with standard PoE, the further network components 14 to be supplied can be implemented in a more space-saving and cost-effective manner on account of the components dispensed with.

Another advantage is the dynamic adaptation of the supply voltage. The following can therefore be achieved, for example, (a basic supply which supplies the communication unit, for example). If the network component 14 signals that an increased power consumption is required, this could be provided by 12. Signaling could be effected using the data connection in this case.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A network component (12), in particular a network-capable vehicle component, of a vehicle network (10), comprising:
   a signal processing device (22) having a processor (20);
   at least one voltage source (24) configured to be connectable to a supply network of the vehicle;
   at least one coupling device (26) connected to the signal processing device (22) and to the voltage source (24);
   at least one network segment (18) of the vehicle network (10) having lines (16) configured to:
      be connectable to the coupling device (26) to simultaneously connect the network segment (18), for signaling purposes,
      be connectable to the signal processing device (22), and
      supply voltage to the network segment (18) by the voltage source (24); and
   an input device configured to manually select at least one voltage level and a signaling connection (40) between the processor (20) of the signal processing device (22) and the voltage source (24) for control thereof by the processor (20),
   wherein the voltage source (24) is configured such that a voltage ratio between at least one supply voltage (Vout, V1out, V2out) provided by the voltage source (24) and the voltage (Vin) provided by the supply network of the vehicle can be selected from a plurality of predetermined voltage ratios.

2. The network component as claimed in claim 1, wherein the voltage source (24) is compatible with a voltage level provided by the supply network, which is a voltage level typical of a vehicle.

3. The network component as claimed in claim 1, wherein the voltage source (24) has a filter and/or protective circuit configured to eliminate interference voltage components from the supply network.

4. The network component as claimed in claim 1, wherein the network component (12) is configured to supply at least two network segments (18) or at least two groups of network segments with supply voltages of different voltage levels.

5. The network component as claimed in claim 1, wherein either one line pair or two line pairs are connectable to the coupling device for each network segment (18).

6. The network component as claimed in claim 1, wherein the signal processing device (22) has a network switch (42) configured to switchably connect, for signaling purposes, the at least one network segment (18) to at least one second network segment of the vehicle network (10).

7. A vehicle network (10) having at least one network component (12) as claimed in claim 1, further comprising at least one further network component (14) in the at least one network segment (18), wherein the at least one further network component (14) and the at least one network segment (18) are configured to be supplied with supply voltage by the one network component (12).

8. The vehicle network as claimed in claim 7, wherein at least one of at least one further network component (14) is a network-capable vehicle component.

9. The vehicle network as claimed in claim 8, wherein the lines (16) in the at least one network segment (18) each comprise only one line pair or each comprise two line pairs.

10. The vehicle network as claimed in claim 9, wherein the vehicle network (10) has a branched topology from the group consisting of a star topology, a tree topology and a meshed topology.

* * * * *